G. SCHLATTER.
MOTOR BRAKE.
APPLICATION FILED MAR. 29, 1917.
1,331,787.
Patented Feb. 24, 1920.
4 SHEETS—SHEET 2.
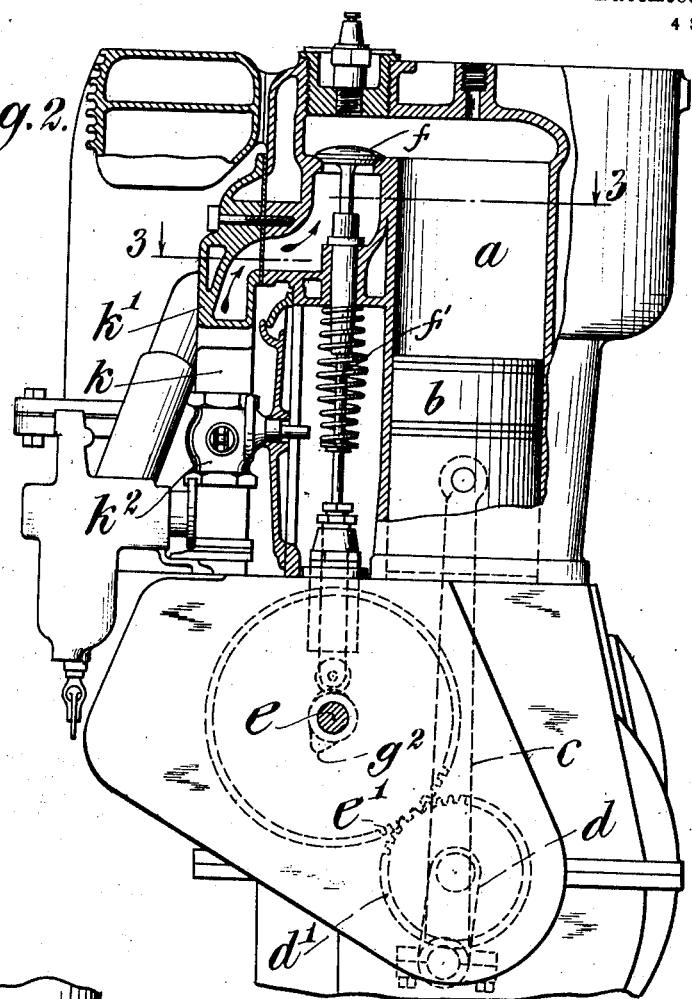
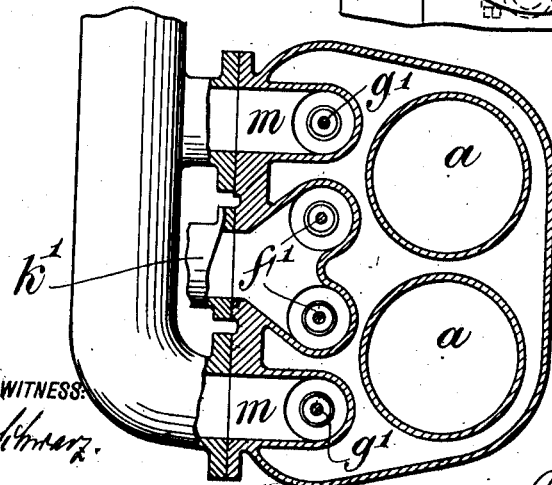

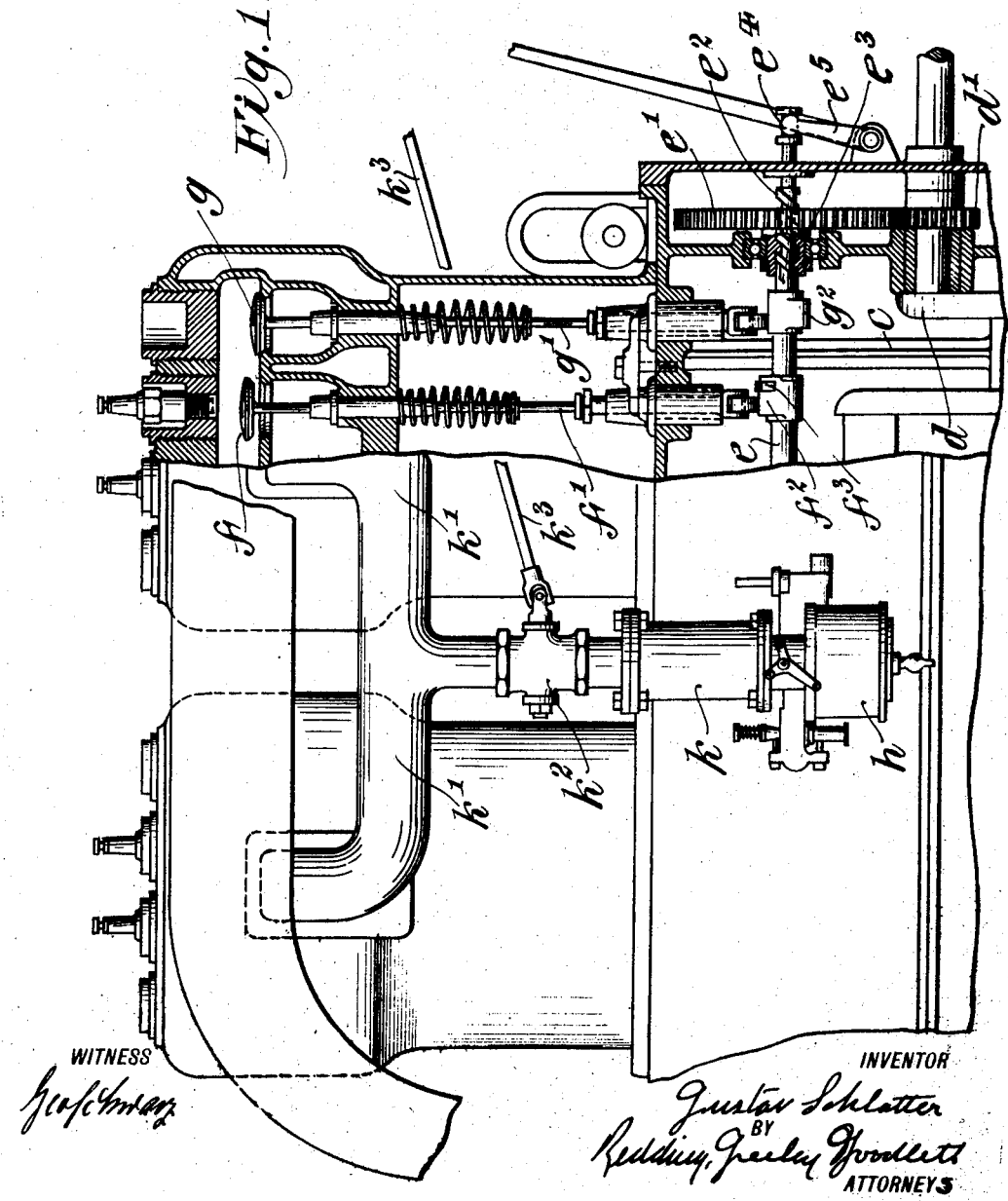

G. SCHLATTER.
MOTOR BRAKE.
APPLICATION FILED MAR. 29, 1917.

1,331,787.  
Patented Feb. 24, 1920.  
4 SHEETS—SHEET 3.

G. SCHLATTER.
MOTOR BRAKE.
APPLICATION FILED MAR. 29, 1917.
1,331,787.
Patented Feb. 24, 1920.
4 SHEETS—SHEET 4.
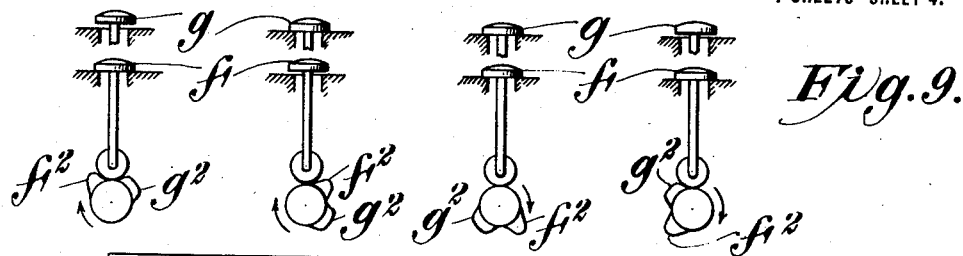
Fig. 9.
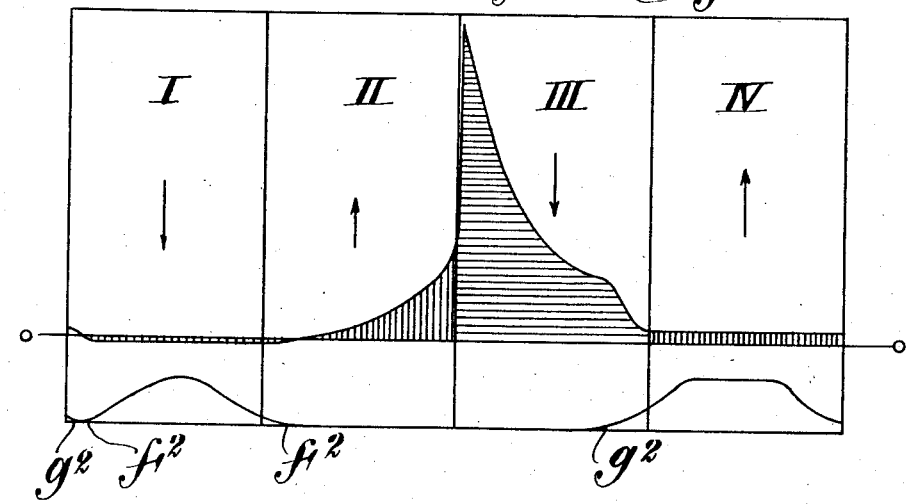
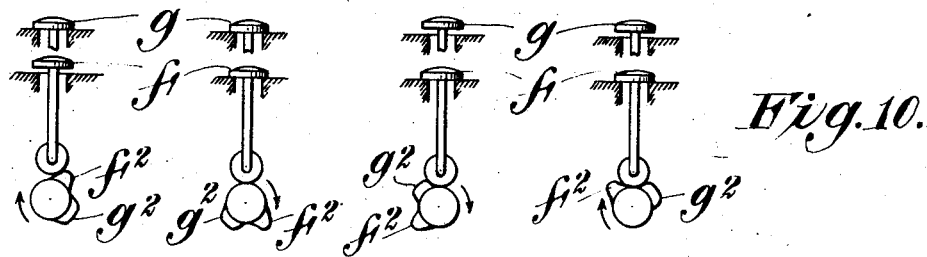
Fig. 10.
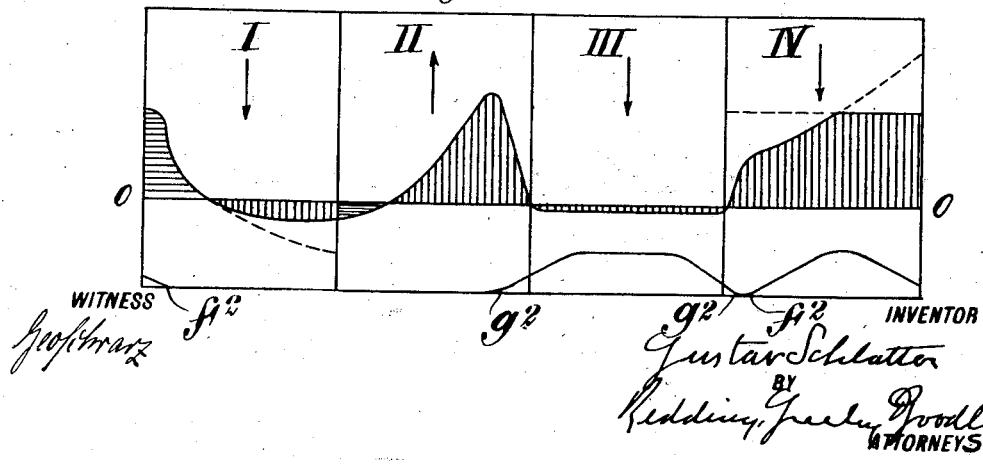
WITNESS
INVENTOR
Gustav Schlatter
BY
Redding, Greeley & Goodlett
ATTORNEYS

UNITED STATES PATENT OFFICE.

GUSTAV SCHLATTER, OF STEINACH, SWITZERLAND, ASSIGNOR TO FIRMA ADOLPHE SAURER, OF ARBON, SWITZERLAND.

MOTOR-BRAKE.

1,331,787.  Specification of Letters Patent.  Patented Feb. 24, 1920.

Application filed March 29, 1917. Serial No. 158,372.

*To all whom it may concern:*

Be it known that I, GUSTAV SCHLATTER, a citizen of the Swiss Republic, and residing at Steinach, Switzerland, have invented certain new and useful Improvements in Motor-Brakes, of which the following is a specification, reference being had to the accompanying drawings, forming a part hereof.

It is a common expedient of skilful drivers of automobiles, while descending a steep grade, to prevent ignition of the charge in the engine cylinders and to utilize the resistance offered by the air or mixture in the cylinders to the return strokes of the pistons as a brake or means to retard the movement of the automobile. The braking effect which it is thus possible to produce with the engine parts as ordinarily constructed and arranged is but moderate and it has been proposed heretofore to provide devices for so controlling the engine valves, particularly the exhaust valves, as to increase the braking effect so produced. In one instance it has been proposed to mount the cams which control the exhaust valves independently of the cams which control the inlet valves and to provide means for shifting the cams which control the exhaust valves so that the exhaust valves shall remain closed during the return strokes of the piston, which will then act against the resistance offered by the air or gas within the cylinder. The constructive execution of this plan of producing a braking effect involves some difficulties, especially when all of the valves, both admission and exhaust, are located at one side of the engine on a common axis. It is difficult, under such circumstances, to provide for the angular shifting of the exhaust cams with reference to the admission cams. By the present invention it is sought to provide means whereby the desired braking effect can be produced through an angular shifting of all of the exhaust cams and admission cams together, without requiring any relative displacement of the exhaust cams and the admission cams. The invention will be more fully explained hereinafter with reference to the accompanying drawings in which it is illustrated as embodied in a 4-cycle, 4-cylinder internal combustion engine of an ordinary type. In the drawings,—

Figure 1 is a view partly in side elevation and partly in vertical section, with part of the casing broken away, of an engine of the type referred to in which the invention is embodied.

Fig. 2 is a view of the same partly in end elevation and partly in vertical section.

Fig. 3 is a view in horizontal section on the plane indicated by the broken line 3—3 of Fig. 2, illustrating particularly the relative arrangement of two cylinders and their admission and exhaust valves.

Figure 4:
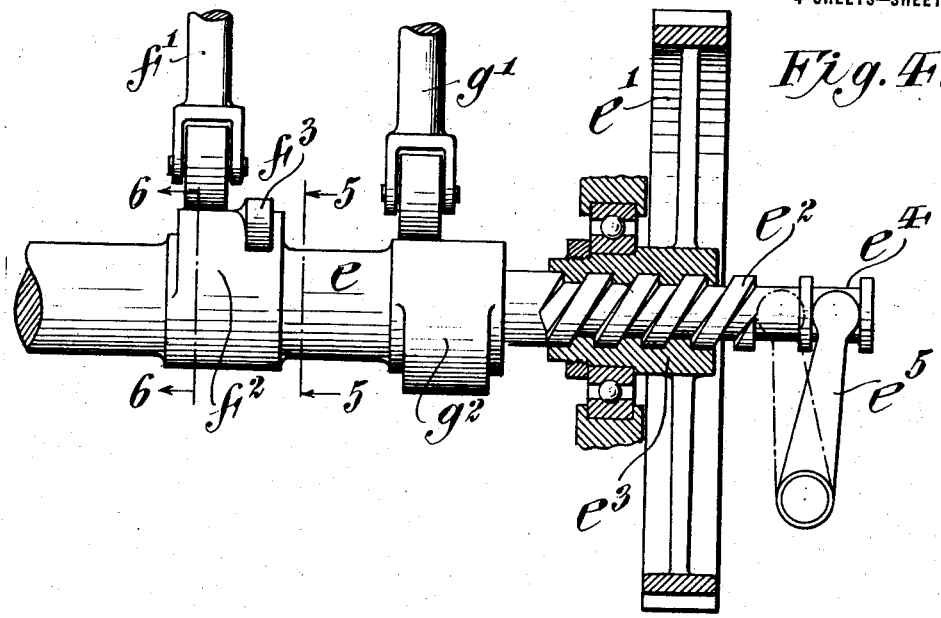
Fig. 4 is a detail view showing a portion of the cam-shaft and the devices for shifting the same angularly.
Figure 5:
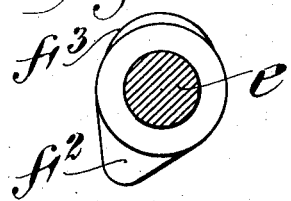
Figure 6:
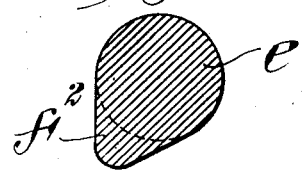

Figs. 5 and 6 are detail views in section on the plane indicated by the broken lines 5—5 and 6—6 of Fig. 4, looking in the direction of the arrows.

Figure 7:
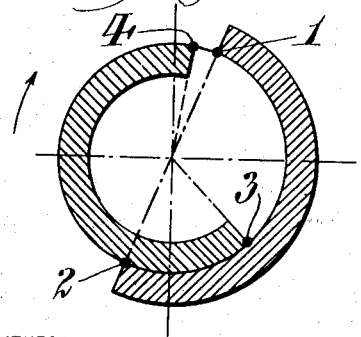
Figure 8:
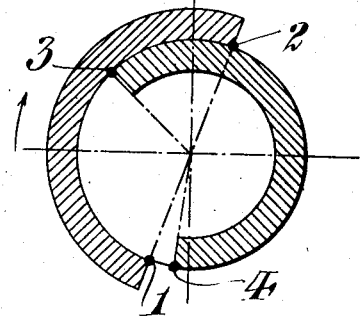

Figs. 7 and 8 are diagrammatic views illustrating respectively the periods of the opening and closing of the exhaust and admission valves during the operation of the engine under ordinary conditions and the operation of the engine while the braking effect is produced.

Figs. 9 and 10 are diagrammatic views, theoretical rather than actual, illustrating the positions of the cams and valves for the several strokes of each complete cycle, the movements of the pistons and the cylinder conditions, Fig. 9 illustrating the conditions which obtain while the engine is operating normally and Fig. 10 illustrating the conditions which obtain while the engine is operating under the braking effect.

The engine which has been chosen for purposes of illustration and explanation of the nature and mode of application of the invention is a 4-cycle engine of ordinary type in which the essential features of such an engine are constructed and coact as usual. That is to say, in each cylinder $a$ is a reciprocating piston $b$ which is connected by a pitman $c$ with the crank-shaft $d$, and a cam-shaft $e$ is driven, by gears $d'$ and $e'$, from the crank-shaft at half the speed of rotation of the crank-shaft.

The charge is admitted to the several cylinders from a common carbureter $h$ through a branched admission or inlet pipe $k'$ and suitable connecting channels, and the exhaust is conducted away through channels $m$. Inlet and exhaust valves $f$ and $g$, operated through valve-lifters $f'$ and $g'$ from the cams on the cam-shaft $e$, control the admission and exhaust, in the normal operation of the engine, in the usual manner. All of the parts thus far specifically referred to may be constructed and arranged to operate in any usual or suitable manner.

For operation of the engine to produce a braking effect in accordance with the present invention the inlet pipe $k$ is provided between the carbureter $h$ and the cylinders $a$, with a valve $k^2$, which is open during the normal operation of the engine but may be closed through suitable operating means, such as the shaft $k^3$, from the driver's seat, when the braking effect is to be produced, the admission pipe between the valve and the cylinders then constituting a compression chamber into which air compressed by the rearward movement of each piston is discharged from each cylinder and from which the air so compressed is returned to the cylinders as hereinafter described.

The inlet and exhaust cams on the cam-shaft $e$, act upon the valve-lifters in the usual manner, in the normal operation of the engine. They retain a fixed relation with respect to each other, not only during the normal operation of the engine but while the braking action is effected, and may be integral with the shaft as usual. To produce the braking action the cams are shifted with respect to the crank phases of the crank-shaft and of the pistons and as such shifting of the cams is conveniently accomplished by the longitudinal shifting of the cam-shaft, the cams, of which one inlet cam $f^2$ and one exhaust cam $g^2$ are shown in Fig. 1, are made sufficiently broad so that, notwithstanding the longitudinal shifting of the shaft, the cams shall remain in operative relation with respect to the rollers of the lifters $f'$ and $g'$ respectively. Furthermore, the longitudinal shifting of the cam-shaft may be taken advantage of to bring an auxiliary cam $f^3$ into operative relation with the inlet cam-lifter $f'$ to effect positively, during the braking operation, the opening of the inlet valve $f$ at a time in the operation when otherwise it would be effected only by a differential pressure in the cylinder, (in which compression is at that time effected,) and in the compression chamber above referred to.

Any convenient means might be provided for effecting the rotary shifting of the cams, but in such a construction as that shown, in which the cams are integral with the cam-shaft, in accordance with the usual practice, this rotary shifting of the cams is conveniently effected by the devices now to be described, the same being shown in detail in Fig. 4. The cam-shaft $e$ is formed with a coarse thread $e^2$ of steep pitch which is engaged by a correspondingly threaded sleeve $e^3$. The latter is mounted on the frame of the engine so as to rotate freely but to be held from longitudinal movement and carries the gear $e^7$ which is driven by the gear $d'$, of half the number of teeth, on the shaft $d$. The cam-shaft $e$ is also formed at its end with a groove $e^4$ which is engaged by a fork $e^5$. The cam-shaft may be shifted longitudinally through the operation of the fork $e^5$ by suitable devices from the driver's seat. The longitudinal shifting of the shaft, through the threaded engagement of the same with the sleeve $e^3$, which is held from longitudinal movement and is engaged by the gear on the crank-shaft, effects a rotary adjustment of the cam-shaft and therefore a rotary shifting of the inlet and exhaust cams $f^2$ and $g^2$ with respect to the angular position of the crank-shaft and therefore the phase of the piston, the extent of angular shifting of the cams being dependent upon the extent of longitudinal movement of the cam-shaft. As the crank-shaft makes two complete rotations for every rotation of the cam-shaft, as is usual in 4-cycle engines, an angular shifting of the cams through 90° corresponds to a change in phase of the crank-shaft of 180°, and to a complete stroke of any one piston. A shifting of the cams through less than 90° corresponds to a change of phase of the crank-shaft proportionately less than 180° and to a proportionate stroke of the piston less than the full stroke.

In describing the operation of the engine reference will be had to the diagrammatic views presented in Figs. 7, 8, 9 and 10, Figs. 7 and 9 illustrating the normal operation of the engine and Figs. 8 and 10 illustrating the operation of the engine under braking conditions.

Referring first to the operation of the engine under normal conditions, illustrated in Fig. 9, in which the positions of the inlet and exhaust valves and cams $f$ and $g$ are indicated for every dead center of the crank-shaft or extreme of movement of the piston, the pressure conditions in the cylinder are indicated, and the relation of the inlet and exhaust cams to the piston movements or phases of operation are shown, it will be seen that at the beginning of the suction stroke I the exhaust valve, although open, is about to close and the inlet valve is about to open, and that during the remainder of the suction stroke, by which the charge is sucked in through the then open inlet valve, the pressure in the cylinder is slightly less than normal or atmospheric, as indicated by the narrow, vertically shaded strip below the zero line $o$, $o$, this strip also indicating the work then done or energy expended by the crank-shaft. At the end of the suction stroke I and at the beginning of the compression stroke II the exhaust valve is still closed and the inlet valve is still open, but just after the dead center is passed the inlet valve closes and both valves remain closed during the remainder of the stroke, the pressure being built up during the stroke and rapidly is moving through its suction stroke and the pressure in the compression chamber is therefore reduced by the flowing of air therefrom into such other cylinder. In the case of a single cylinder engine, to which the invention is equally applicable, the pressure in the cylinder during the fourth stroke of the piston would continue to be built up to the end of the stroke, as indicated by the dotted line.

In Fig. 8 the points in the revolution of the crank at which the valve changes take place, during the braking action, are indicated; the inlet valve closes shortly after the crank passes its high dead center, as indicated by the point 2 and both valves remain closed during the remainder of the stroke. In the compression stroke II the inlet valve remains closed throughout the stroke but the exhaust valve opens at point 3, shortly before the crank again passes its high dead center. During the normal expansion stroke III the exhaust valve remains open and the inlet valve remains closed. Shortly after the crank passes its low dead center, at the beginning of stroke IV the exhaust valve closes at point 4 and shortly thereafter the inlet valve opens at point 1.

Upon examination of the pressure diagram of Fig. 10 it will be noted that although some work is done upon the piston, as indicated by the horizontally shaded portions of strokes I and II, the work done by the piston, as indicated by the vertically shaded portions of strokes I, II, III and IV, is greatly in excess of the work done upon the piston, so that the net braking effect, due to the resistance offered to the movement of the piston, is great.

It will be understood that the embodiment of the invention will be varied in details of construction and arrangement to suit the character of the engine to which it is applied and that the invention, therefore, is not limited to the particular construction and arrangement shown and described herein.

I claim as my invention:

1. In a 4-cycle, internal combustion engine having a cylinder, a piston, an inlet pipe a carbureter in communication with the inlet pipe and inlet and exhaust valves, a valve between the carbureter and the cylinders to close the inlet pipe and thereby form a compression chamber, and actuating means for the inlet and exhaust valves to open and close the inlet valve to open the exhaust valve during the normal expansion stroke, to close the exhaust valve during the normal exhaust stroke, and to close the exhaust valve during the normal suction and compression strokes.

2. In a 4-cycle, internal combustion engine having a cylinder, a piston, an inlet pipe, a carbureter in communication with the inlet pipe and inlet and exhaust valves, means under the control of the operator to close the inlet valve during the braking operation, a cam-shaft, inlet and exhaust cams in fixed relation on said shaft, means to drive the cam-shaft from the crank-shaft, and means to shift the cam-shaft and both the inlet and the exhaust cams rotarily with respect to the crank-shaft.

3. In a 4-cycle, internal combustion engine having a cylinder, a piston, an inlet pipe, a carbureter in communication with the inlet pipe, and inlet and exhaust valves, means under the control of the operator to close the inlet valve during the braking operation, a cam-shaft, broad inlet and exhaust cams and an auxiliary inlet cam in fixed relation on said shaft, means to drive the cam-shaft from the crank-shaft, and means to shift the cam-shaft and cams rotarily with respect to the crank-shaft and to shift the cam-shaft longitudinally to place the auxiliary cam in operative relation with respect to the inlet valve.

4. In a 4-cycle, internal combustion engine having a cylinder, a piston, an inlet pipe, a carbureter in communication with the inlet pipe, and inlet and exhaust valves, means under the control of the operator to close the inlet valve during the braking operation, a cam-shaft carrying both inlet and exhaust cams having a steeply screw-threaded portion, a rotatable and longitudinally movable threaded sleeve engaging the threaded portion of the cam-shaft, means to drive the cam-shaft from the crank-shaft, and means to shift the cam-shaft longitudinally with respect to said sleeve.

5. In a 4-cycle, internal combustion engine, having a cylinder, a piston, an inlet pipe, a carbureter in communication with the inlet pipe, and inlet and exhaust valves, means under the control of the operator to close the inlet valve during the braking operation, a cam-shaft, inlet and exhaust cams in fixed relation on said shaft, means to drive the cam-shaft from the crank-shaft, and means to shift the cam-shaft and cams rotarily with respect to the crank-shaft.

6. In a 4-cycle, multi-cylinder, internal combustion engine having a plurality of cylinders, a plurality of pistons, a common inlet pipe a carbureter in communication with the inlet pipe, and a plurality of sets of inlet and exhaust valves, means under the control of the operator to close the inlet valve during the braking operation, a cam-shaft, a plurality of sets of inlet and exhaust cams in fixed relation on said shaft, means to drive the cam-shaft from the crank-shaft, and means to shift the cam-shaft and cams rotarily with respect to the crank-shaft.

7. In a 4-cycle, multi-cylinder, internal combustion engine having a plurality of towards its end, as indicated by the vertically shaded area. At or near the beginning of the expansion stroke III ignition takes place and work is done by the expanding gases and energy imparted to the crank-shaft, as indicated by the horizontally shaded area, the pressure falling off throughout the stroke and rapidly near the end at the point where the exhaust valve begins to open. At the beginning of the exhaust stroke IV the exhaust valve is open and remains open throughout the stroke, while the inlet valve remains closed, the amount of work done or energy expended by the crankshaft in expelling the exhaust gases being indicated by the vertically shaded strip above the zero line o, o.

In Fig. 7 the points in the revolution of the crank at which the valve changes take place are indicated; the exhaust valve closes at the point 4, just after the crank has passed high dead center at the beginning of the suction stroke; soon afterward the inlet valve opens at the point 1, also in the early part of the suction stroke; the inlet valve closes at the point 2 soon after the crank passes the low dead center; in the expansion stroke both the inlet valve and the exhaust valve remain closed for about three-fourths of the stroke, but shortly before the crank reaches again its low dead center the exhaust valve opens at the point 3 and continues open until shortly after the crank passes again its high dead center at the point 4.

In the braking action the engine operates as an air pump, that is to say, the further admission of the explosive is prevented by closing the valve $k^2$ and the energy developed by the momentum of the car in descending a grade is used up by the piston in compressing, in each return stroke, the air which is confined between it and the cylinder head or between it and the valve $k^2$ which closes the compression chamber then formed in the inlet pipes.

Referring now to the operation of the engine under braking conditions, illustrated in Fig. 10, in which the positions of the inlet and exhaust valves and cams $f^2$ and $g^2$ are indicated for every dead center of the crank-shaft or extreme of movement of the piston, the pressure conditions in the cylinder are indicated, and the relations of the inlet and exhaust cams to the piston movements or phases of operation are shown, it will be seen that at the beginning of the suction stroke I the exhaust valve is closed and the inlet valve is open but is about to close. The air previously compressed in the admission pipes expands into the cylinder while the inlet valve remains open and does some work on the piston and the crank-shaft, as indicated by the horizontally shaded portion, but after the inlet valve has closed and the air has expanded, then the piston begins to do work and continues to do work through the remainder of the stroke in reducing the pressure in the cylinder below normal or atmospheric pressure, as indicated by the vertically shaded portion below the zero line. The auxiliary inlet cam $f^3$ serves at this time to hold open or to reopen the inlet valve so as to permit the pressure in the cylinder and in the admission pipes to be equalized notwithstanding the tendency of the usual spring to close the inlet valve. If the inlet valve were opened only by the differential of pressure in the admission pipes and in the cylinder the reduction of pressure below the normal and therefore the work done by the piston would be as indicated by the dotted line in the left hand portion of the pressure diagram of Fig. 10, but because of the positive opening of the valve the pressure is reduced below the normal only as indicated by the vertically shaded portion. At the beginning of the compression stroke II both valves are closed and remain closed until near the end of the stroke. The partial vacuum previously produced in the cylinder, as indicated by the vertically shaded portion below the zero line, assists slightly the movement of the piston in the first part of the compression stroke, as indicated by the horizontally shaded portion below the zero line, but until the exhaust valve opens near the end of the compression stroke II, the piston, driven by the crank-shaft, does work in compressing the air between it and the head of the cylinder, as indicated by the vertically shaded portion above the zero line. When the exhaust valve opens, near the end of the compression stroke, the pressure in the cylinder falls rapidly. At the beginning of the normal expansion stroke III and throughout the same the exhaust valve remains open and a small amount of work is done by the piston in sucking in fresh air through the exhaust valve, as indicated by the vertically shaded strip below the zero line. Shortly after the beginning of the normal exhaust stroke IV the exhaust valve closes and shortly afterward the inlet valve opens. The piston then does work throughout the remainder of the stroke in compressing the air between it and the head of the cylinder and into the compression chamber formed in the admission pipes. If the inlet valve were not opened during this stroke the pressure would build up in the cylinder to the end of the stroke, as indicated by the dotted line, but by reason of the opening of the inlet valve the pressure is equalized in the cylinder and in the compression chamber and the work done by the piston during this stroke is therefore indicated by the vertically shaded portion. It will be borne in mind that during the compression stroke of one piston of a multi-cylinder engine, the piston of another cylinder cylinders, a plurality of pistons, a common inlet pipe, and a plurality of sets of inlet and exhaust valves, a cam-shaft, a plurality of sets of inlet and exhaust cams in fixed relation on said shaft, means to drive the cam-shaft from the crank-shaft, means to shift the cam-shaft and cams rotarily with respect to the crank-shaft, and a valve under the control of the operator to close the inlet pipe to the external air and form a compression chamber.

This specification signed this 2nd day of February A. D. 1917.

GUSTAV SCHLATTER.